United States Patent

Wiesner et al.

(10) Patent No.: US 9,663,845 B2
(45) Date of Patent: *May 30, 2017

(54) ALUMINUM ALLOY

(71) Applicants: Georg Fischer Druckguss GmbH & Co. KG, Herzogenburg (AT); Georg Fischer GmbH & Co KG, Altenmarkt, St. Gallen (AT)

(72) Inventors: Stuart Wiesner, Schaffhausen (CH); Leif Speckert, Gottlieben (CH)

(73) Assignees: Georg Fischer Druckguss GmbH & Co. KG (AT); Georg Fischer GmbH & Co KG (AT)

( * ) Notice: Subject to any disclaimer, the term of this patent is extended or adjusted under 35 U.S.C. 154(b) by 403 days.

This patent is subject to a terminal disclaimer.

(21) Appl. No.: 14/394,672

(22) PCT Filed: Apr. 3, 2013

(86) PCT No.: PCT/EP2013/056968
§ 371 (c)(1),
(2) Date: Oct. 15, 2014

(87) PCT Pub. No.: WO2013/156301
PCT Pub. Date: Oct. 24, 2013

(65) Prior Publication Data
US 2015/0071815 A1    Mar. 12, 2015

(30) Foreign Application Priority Data

Apr. 17, 2012 (EP) ..................... 12164352

(51) Int. Cl.
C22C 21/04 (2006.01)
C22F 1/043 (2006.01)
C22C 21/02 (2006.01)
B62D 29/00 (2006.01)
C22F 1/04 (2006.01)

(52) U.S. Cl.
CPC ............ *C22C 21/04* (2013.01); *B62D 29/008* (2013.01); *C22C 21/02* (2013.01); *C22F 1/043* (2013.01)

(58) Field of Classification Search
CPC ......... C22C 21/02; C22C 21/04; C22F 1/043; C22F 1/05
See application file for complete search history.

(56) References Cited

U.S. PATENT DOCUMENTS 7,108,042 B2 *  9/2006  Koch .................. C22C 1/06
                                                 164/113

FOREIGN PATENT DOCUMENTS

| DE | 29522065 U1 | 9/1999 |
| DE | 20-2006-006518 U1 | 9/2006 |
| DE | 10-2009-012073 A1 | 9/2010 |
| EP | 1978120 A1 | 10/2008 |

OTHER PUBLICATIONS

W. Hufnagel et al., "Aluminium-Taschenbuch 14th edition", Aluminium-Verlag Dusseldorf, 1988, pp. 46-47.
International Search Report (in English and German) for PCT/EP2013/056968, mailed Sep. 23, 2013; ISA/EP.
International Preliminary Report on Patentability (Chapter 1 of the Patent Cooperation Treaty) for PCT/EP2013/056968, Issued Oct. 21, 2014.

* cited by examiner

Primary Examiner — Lois Zheng
(74) Attorney, Agent, or Firm — Harness, Dickey & Pierce, P.L.C.

(57) ABSTRACT

An aluminum alloy for components with increased rigidity, having a tensile yield strength Rp0.2>200 MPa and simultaneous elongation at break A>6% after a heat treatment, or a tensile yield strength Rp 0.2>120 MPa and simultaneously high elongation at break A>9% in the cast state, or >10% after a T6 heat treatment, in particular for structural and chassis components of a motor vehicle, containing 9 to 11.5 wt % silicon, 0.5 to 0.8 wt % manganese, 0.2 to 1.0 wt % magnesium, 0.1 to 1.0 wt % copper, 0.2 to 1.5 wt % zinc, 0.05 to 0.4 wt % zirconium, 0.01 to 0.4 wt % Cr, max. 0.2 wt % iron, max. 0.15 wt % titanium, 0.01 to 0.02 wt % strontium and the remainder as aluminum and production-related impurities with a maximum total of 0.5 wt %.

7 Claims, No Drawings

ALUMINUM ALLOY

CROSS-REFERENCE TO RELATED APPLICATIONS

This application is a National Stage of International Application No. PCT/EP2013/056968, filed on Apr. 3, 2013, and published in German as WO/2013/156301 A1 on Oct. 24, 2013. This application claims the benefit and priority of European Application No. 12164352.2, filed on Apr. 17, 2012. The entire disclosures of the above applications are incorporated herein by reference.

BACKGROUND

This section provides background information related to the present disclosure which is not necessarily prior art.

Technical Field

The present invention relates to an aluminum alloy for components having increased strength with a yield point $Rp_{0.2}>200$ MPa and at the same time an elongation at break $A>6\%$ after a heat treatment, or a yield point $Rp_{0.2}>120$ MPa and at the same time a high elongation at break $A>9\%$ in the cast state or an elongation at break $>10\%$ after a T6 heat treatment, in particular for structural parts and chassis parts of a motor vehicle.

Discussion

Good flow and mould-filling properties and solidification characteristics are critical in the case of structural components produced by a pressure casting process, in particular in the case of thin-wall components, and also when the pressure casting process is used for chassis parts. Thin-wall structural components are of particular interest in the automobile industry since these provide a weight advantage for the same component function as a result of lower materials usage, and this in turn reduces the operating costs and decreases environmental pollution.

The further development of the pressure casting technique now allows complicated components having a high strength and high elongation to be produced. Chassis parts are manufactured in many places by other casting processes such as chill casting. The reason is that, in the pressure casting process, the required strengths cannot be achieved or cannot be achieved at a satisfactory elongation in order to ensure reliable operation.

To achieve the required mechanical properties, especially a high ductility, a heat treatment, for example according to T6 (solution heat treated, quenched and aged hot) or T7 (solution heat treated, quenched and overaged), is usually carried out in the case of structural and chassis parts made of pressure casting alloys of the AlSi10MnMg type. This changes the cast microstructure of any component which then satisfies more demanding requirements in respect of strength and elongation at break. While an alloy of this type in the cast state has a yield point $Rp_{0.2}$ of about 110 MPa at an elongation at break A of 4-5%, an increase to above 150 MPa at not less than 7% elongation can be achieved by means of a T6 heat treatment. This is based on the strengthening effect of precipitation hardening in which the alloying elements Mg and Si participate. In addition, coalescence of the Si eutectic increases the ductility. Such a heat treatment is, for example, carried out as follows: a solution heat treatment in the temperature range from 450 to 535° C. is followed by quenching in water or in air to temperatures below about 100° C. As a result of the solution heat treatment, the alloying elements are homogeneously finely distributed due to diffusion processes and constrained in the α-Al by the quenching. In addition, the Si eutectic is spheroidized. The alloy now has a high ductility but only a low strength. As a result of the subsequent hot ageing at 150-250° C., fine uniformly distributed $Mg_2Si$ precipitates are formed and these in turn increase the strength of the material. Depending on the temperature profile of the T6 heat treatment, the mechanical properties can be optimized in terms of either strength or elongation at break, by which means a very wide property and thus product folio can be obtained from one alloy. To reduce production costs, a T5 heat treatment, i.e. hot ageing at 150-250° C. without prior solution heat treatment, can also suffice. Here too, the strength increase is due to formation of $Mg_2Si$ precipitates, but to a lesser extent since the quenching effect of a component taken from the casting tool is less pronounced and the proportion of magnesium forced to dissolve in the α-Al therefore also decreases.

One disadvantage is that a limit is set for common pressure casting alloys of the AlSi10MnMg type, on account of the alloy composition, with respect to the hardening potential and therefore the increase in strength with a constant elongation.

Far higher strengths of up to 600 MPa for the yield point $Rp_{0.2}$ are achieved by mechanically alloyed AlZnMg and AlMgCu alloys because of their greater hardening potential. In these types of alloy, the strengthening effect is based on the precipitation hardening of the alloying elements Mg, Cu and Zn (W. Hufnagel et al., "Aluminium-Taschenbuch 14th edition", Aluminium-Verlag Dusseldorf, 1988, p. 46ff). However, owing to their susceptibility to hot cracks and their tendency to stick in the casting mould, these alloys are not suitable for pressure casting.

As further demands made of a structural or chassis part produced by a pressure casting process, mention may be made of, in addition to the demanding requirements in terms of strength and elongation, corrosion resistance, suitability for welding and life of the casting moulds. A further requirement is the dimensional stability of the components after heat treatment in order to be able to ensure problem-free assembly of the vehicle body.

Complicated solution heat treatments have, apart from additional economic costs for the heat treatment itself, the disadvantage that components tend to distort as a result of the sharp quenching, which can lead to further machining work and an increased reject rate.

SUMMARY OF THE INVENTION

It is an object of the invention to provide an aluminum pressure casting alloy which makes it possible, due to increased strength combined with high elongation, to make both structural and chassis components in a pressure casting process. This preferably includes chassis parts which, owing to the demanding mechanical requirements (e.g. yield point $Rp_{0.2}>200$ MPa and at an elongation at break of >6%) and the component geometry, tend to be produced by processes other than the pressure casting process. In addition, it is an object of the invention to ensure good castability and filling of the mould. Furthermore, the alloy should allow very many joining techniques, have high dimensional stability and have good corrosion resistance.

The object is achieved according to the invention by the aluminum alloy consisting of from 9 to 11.5% by weight of silicon, from 0.5 to 0.8% by weight of manganese, from 0.2 to 1% by weight of magnesium, from 0.1 to 1.0% by weight of copper, from 0.2 to 1.5% by weight of zinc, from 0.05 to 0.4% by weight of zirconium, from 0.01 to 0.4% by weight of Cr, not more than 0.2% by weight of iron, not more than 0.15% by weight of titanium, from 0.01 to 0.02% by weight of strontium and as balance aluminum and production-related impurities up to a total of not more than 0.5% by weight, as a result of which increased strengths combined with high elongation are ensured, both in the cast state and after heat treatment, for example after a T5, T6, T7 heat treatment or other known heat treatments. The hot ageing can also be carried out on the component within a further process step, for example a surface coating operation.

The achievement of the required quality, including in respect of strength and elongation, can be influenced greatly by the choice of alloy. The alloy composition according to the invention with the aim of increased strengths here has a target corridor for the yield point $Rp_{0.2}>200$ MPa and an elongation at break $A>10\%$.

According to the invention, the alloy has a high hardening potential, which is utilized in hot ageing at temperatures in the range from 150 to 250° C. As a result of the development, it has been found that a significant strength-increasing effect without decreases in the elongation combined with satisfactory corrosion resistance is achieved by the addition of small amounts of copper or zinc. The desired effect is achieved by addition of from 0.1 to 1.0% by weight of copper, preferably from 0.15 to 0.5% by weight of copper (and more preferably from 0.3 to 0.5% by weight of copper) and from 0.2 to 1.5% by weight of zinc, preferably from 0.4 to 1.5% by weight of zinc. The addition of zinc also improves the casting behaviour and filling of the mould.

A combined addition of copper and zinc in the advantageous ratio within the abovementioned proportions allows a further increase in strength combined with satisfactory corrosion resistance.

The proportion of silicon in the alloy is from 9 to 11.5% by weight. The alloying-in of silicon reduces the shrinkage on solidification and thus assists good casting behaviour and good filling of the mould.

The addition of from 0.2 to 1.0% by weight of magnesium, preferably from 0.2 to 0.8% by weight of magnesium, has a strength-increasing effect caused by the above-described precipitation hardening. In addition, an addition in an advantageous ratio to copper and zinc decreases the susceptibility of the aluminum pressure casting alloy of the invention to corrosion.

An addition of zirconium brings about an increase in the elongation without an accompanying decrease in the strength since a finer eutectic microstructure is present as a result. The zirconium content of the pressure casting alloy of the invention is 0.05 to 0.4% by weight.

Formation of a coarse and acicular AlSi eutectic is avoided by addition of strontium. An addition of from 0.01 to 0.02% by weight of strontium modifies the eutectic in such a way that it forms a fine and more lamellar structure and also serves to avoid no upgrading and also overupgrading.

An addition of chromium brings about a further increase in the mechanical properties; the content of this is 0.01 to 0.4% by weight, preferably 0.01 to 0.3% by weight.

The combined content of manganese and iron significantly influences the life of the casting moulds and the demouldability. The desired effect is achieved by an addition of not more than 0.2% by weight of iron and a manganese content of from 0.5 to 0.8% by weight. It is advantageous to keep the iron content low in order to avoid embrittlement of the material by formation of acicular AlFeSi phases in the microstructure. Simultaneous addition of manganese counters excessive attack by the low-iron melt on the casting mould and, by reducing the tendency to stick, improves the demouldability and thus the dimensional stability. However, in the case of a simultaneous addition of iron, manganese and chromium, it is necessary to set an advantageous ratio in order to avoid formation of gravity sediments since these have an adverse effect both on the flowability and the tendency to stick.

The addition of titanium brings about a decrease in the α-Al grain size by provision of nuclei during the formation of aluminum dendrites. The titanium content is not more than 0.15% by weight.

Further advantages and features of the novel aluminum alloy are revealed in the following examples, but the invention is not restricted to only the examples.

A number of specimen components in the form of a pressure-cast component and two spherical specimens were produced in a pressure casting process in two aluminum alloys having the following alloy compositions:

|  | Alloy 1 | Alloy 2 |
| --- | --- | --- |
| Si [% by wt.] | 10.8 | 11.4 |
| Fe [% by wt.] | 0.15 | 0.16 |
| Mn [% by wt.] | 0.56 | 0.57 |
| Cu [% by wt.] | 0.3 | 0.38 |
| Zn [% by wt.] | 0.56 | 0.25 |
| Mg [% by wt.] | 0.49 | 0.58 |
| Ti [% by wt.] | 0.13 | 0.08 |
| Cr [% by wt.] | 0.01 | 0.05 |
| Sr [% by wt.] | 0.017 | 0.017 |
| Zr [% by wt.] | 0.1 | 0.07 |

After pressure casting, two different T6 heat treatments were carried out and tensile specimens were taken from the pressure-cast component. The measured values of the mechanical properties after these heat treatments and in the cast state are shown in the following table:

|  | $Rp_{0.2}$ [MPa] | $R_m$ [MPa] | A [%] |
| --- | --- | --- | --- |
| Alloy 1 As cast | 138 | 300 | 9.2 |
| Alloy 1 T6 | 273 | 366 | 9.1 |
| Alloy 1 T6 modified | 146 | 241 | 12.8 |
| Alloy 2 As cast | 142 | 300 | 9.0 |
| Alloy 2 T6 | 280 | 371 | 9.4 |
| Alloy 2 T6 modified | 143 | 242 | 12.1 |

It can be seen from the table that specimens made of the alloys 1 and 2 have a yield point $Rp_{0.2}>270$ MPa combined with a high elongation at break of $A>9\%$ or have a yield point $Rp_{0.2}>140$ MPa at an increased elongation at break of $>12\%$ after a heat treatment, depending on the execution of said heat treatment. As a result, it is clear that the aluminum alloy of the invention is, in each case after heat treatment, particularly suitable for the production of crash- and strength-relevant chassis and structural parts of a motor vehicle by a pressure casting process. A yield point $Rp_{0.2}$ of $>200$ MPa combined with an elongation at break of $>6\%$ should be achieved in the production of chassis components of a motor vehicle by the pressure casting process. The abovementioned aluminum alloy makes it possible to produce such chassis components by the pressure casting process instead of other processes such as chill casting and sand casting which are customarily utilized for such parts, because of the increase according to the invention in the strength while maintaining the same high elongation.

As can similarly be seen from the table, the aluminum alloy of the invention is also suitable for producing crashand strength-relevant structural and chassis components of a motor vehicle by a pressure casting process, since here a yield point $Rp_{0.2}$ of >120 MPa combined with an elongation at break of >10% is to be achieved, in particular in order to ensure a high absorption of energy and deformability. The aluminum alloy similarly achieves the strength properties required here in the cast state, with an elongation at break of A>9%.

Further studies have also shown the good corrosion resistance and weldability of such alloys.

The aluminum alloy of the invention is especially suitable for producing strength- and crash-relevant components of a motor vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An aluminum alloy comprising: an alloy for components having increased strength with a yield point $Rp_{0.2}$>200 MPa and at the same time an elongation at break A>6% after a heat treatment, or a yield point $Rp_{0.2}$>120 MPa and at the same time a high elongation at break A>9% in a cast state or an elongation at break>10% after a T6 heat treatment, in particular for structural and chassis parts of a motor vehicle containing from 9 to 11.5% by weight of silicon, from 0.5 to 0.8% by weight of manganese, from 0.2 to 1.0% by weight of magnesium, from 0.1 to 1.0% by weight of copper, from 0.2 to 1.5% by weight of zinc, from 0.05 to 0.4% by weight of zirconium, from 0.01 to 0.4% by weight of Cr, not more than 0.2% by weight of iron, not more than 0.15% by weight of titanium, from 0.01 to 0.02% by weight of strontium and as balance aluminum and production-related impurities up to a total of not more than 0.5% by weight.

2. The aluminum alloy according to claim 1, wherein the aluminum alloy comprises from 0.4 to 1.5% by weight of zinc.

3. The aluminum alloy according to claim 1, wherein the aluminum alloy comprises from 0.15 to 0.5% by weight of copper.

4. The aluminum alloy according to claim 1, wherein the aluminum alloy comprises from 0.3 to 0.5% by weight of copper.

5. The aluminum alloy according to claim 1, wherein the aluminum alloy comprises from 0.2 to 0.8% by weight of magnesium.

6. The aluminum alloy according to claim 1, wherein the aluminum alloy comprises from 0.01 to 0.3% by weight of chromium.

7. The aluminum alloy according to claim 1 for the pressure casting of crash- and strength-relevant structural and chassis components of a motor vehicle.

* * * * *